April 24, 1956  L. Q. HINES, SR., ET AL  2,743,043
APPARATUS FOR DISTRIBUTING FERTILIZER, LIME AND LIKE MATERIALS
Filed April 9, 1952  2 Sheets-Sheet 1
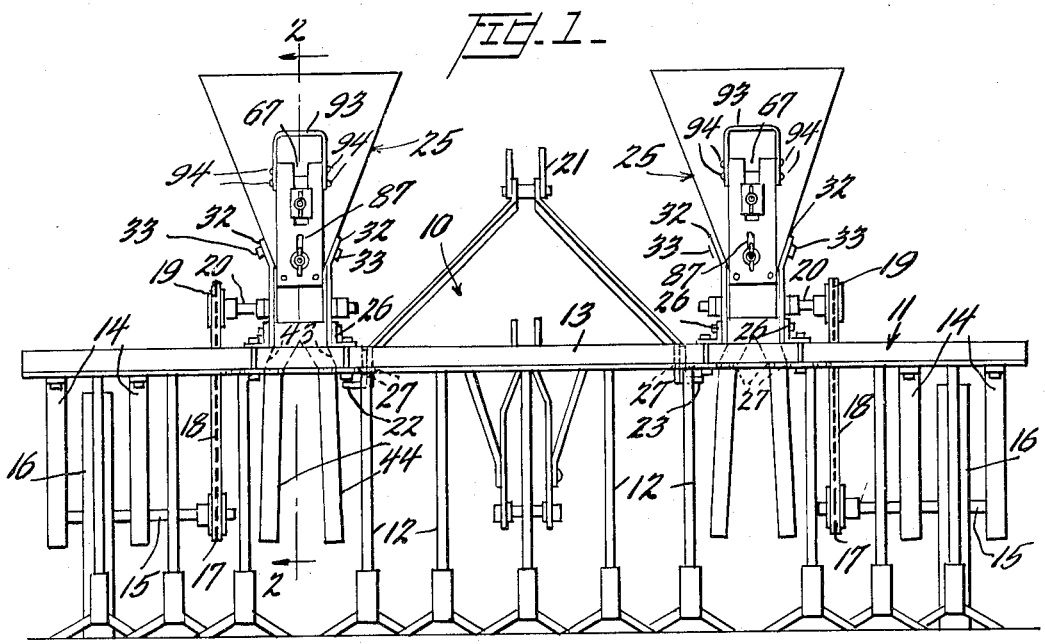
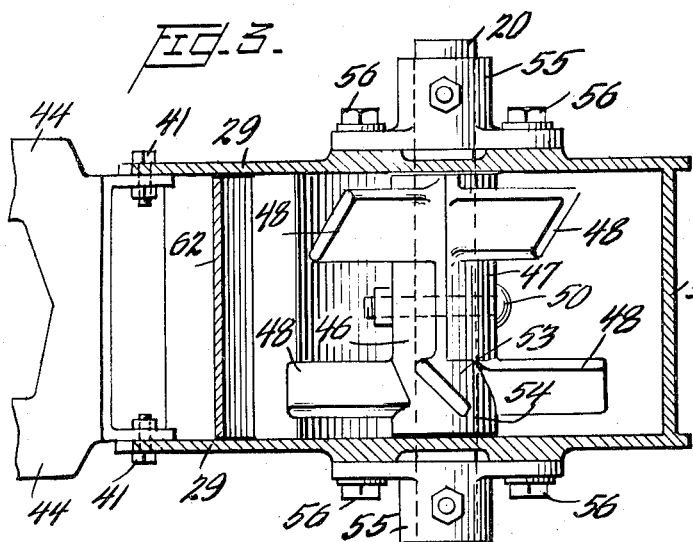
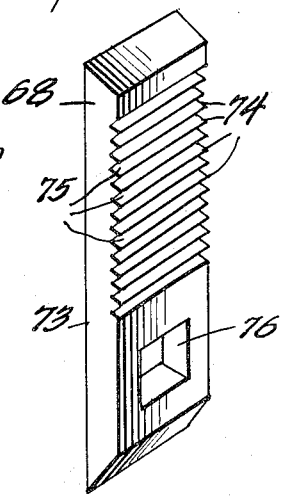
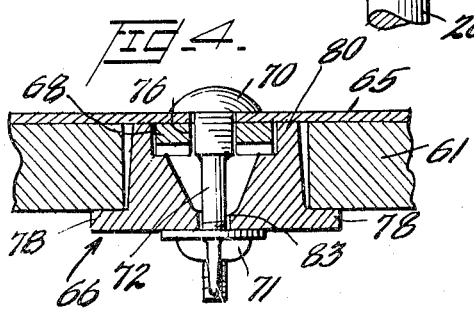
INVENTORS
Lloyd Quinby Hines, Sr.
Edward Henry Harris,
BY Parker and Walsh.
ATTORNEYS

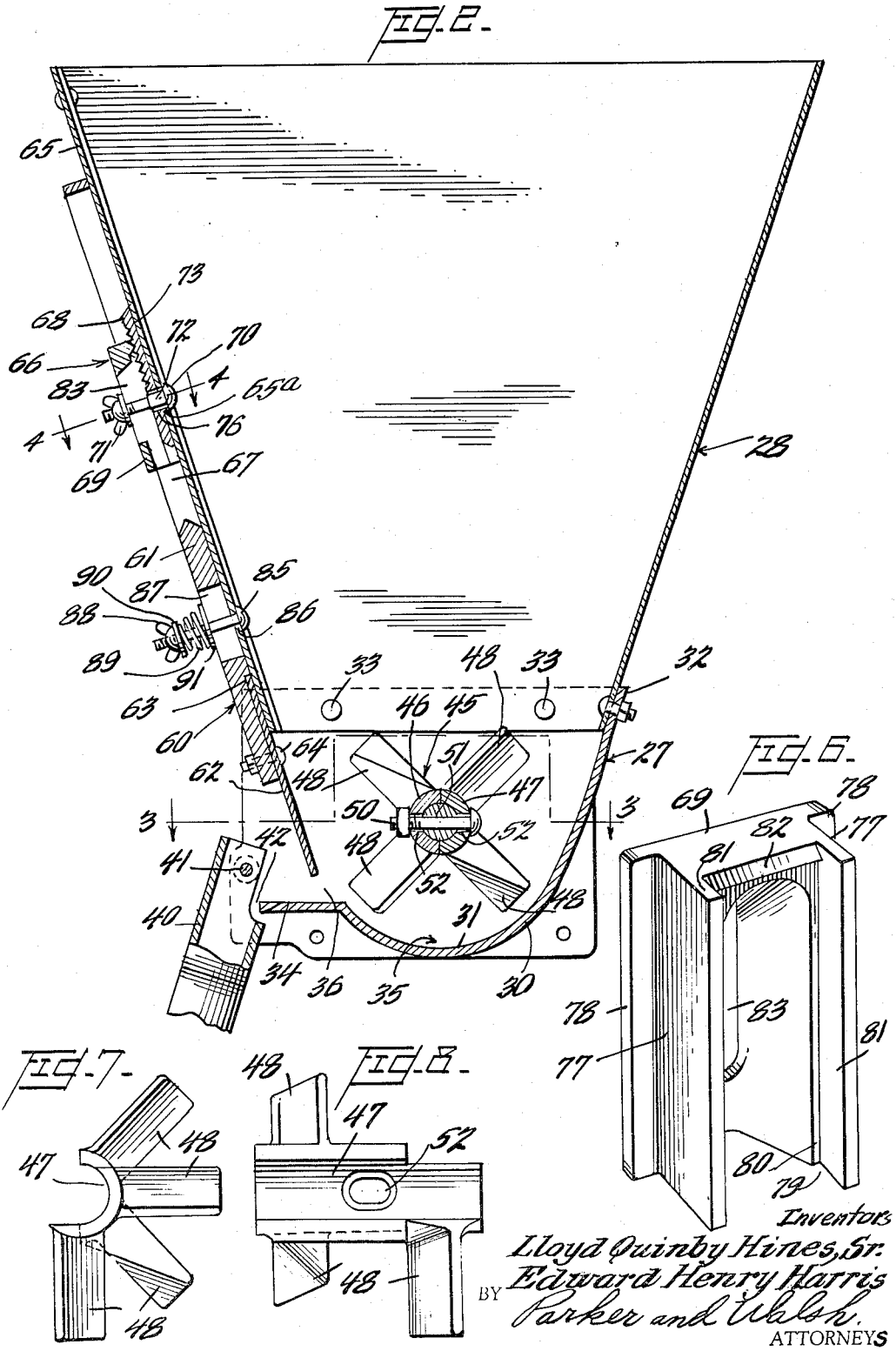

United States Patent Office 2,743,043
Patented Apr. 24, 1956

2,743,043

APPARATUS FOR DISTRIBUTING FERTILIZER, LIME AND LIKE MATERIALS

Lloyd Quinby Hines, Sr., and Edward Henry Harris, Suffolk, Va., assignors to The Ferguson Manufacturing Company, Inc., Suffolk, Va., a corporation of Virginia Application April 9, 1952, Serial No. 281,312

1 Claim. (Cl. 222—311)

This invention relates to apparatus for feeding and distributing fertilizer, lime and like materials and aims generally to simplify and improve the construction and operation of apparatus of this type.

Various types of apparatus for distributing fertilizer, lime and like materials are known to the art. These generally include a hopper or receptacle of some type for holding the material, some means for discharging the material from the bottom of the hopper, and means for distributing the fertilizer on the ground in the desired manner.

One of the most frequent objections to apparatus of this type is that material continues to flow by gravity through the distributing means after the apparatus is stopped, thereby resulting in an excess of material at the place where the apparatus is stopped. Various attempts to overcome this have been only partially successful or else have been open to other objections.

An important object of the present invention is the provision of mobile apparatus of this type which will uniformly and continuously discharge material such as fertilizer, lime and the like while in motion, but which will not discharge material when the apparatus is stopped.

A further object of the invention is the provision of apparatus of this type embodying improved means for feeding and discharging material and for distributing same on the ground.

Still another object of the invention is the provision of a distributor for fertilizer and like materials embodying a novel type of agitating and feeding rotor having axially spaced blades thereon constructed and arranged to throw the fertilizer or like material from both sides to the center, thereby causing the fertilizer to have greater force than when moved by blades or paddles which just lift it up.

A further object of the invention is the provision of a fertilizer distributor employing a novel type of two-piece agitating and feeding member which can be easily and quickly clamped on the shaft of the device with one bolt, and which at the same time will impart a spiral movement to the fertilizer as it passes through the discharge opening of the device.

A still further object of the invention is the provision of a device of this type embodying improved adjustable means for controlling the discharge of material.

These and other objects and advantages of the present invention will become more apparent during the course of the following description when taken in connection with the accompanying drawings.

In the drawings,

Figure 1 is an end elevational view of one form of apparatus embodying the invention, Figure 2 is an enlarged vertical cross-sectional view of the fertilizer holding and distributing hopper and associated mechanism, taken on the line 2—2 of Figure 1, Figure 3 is an enlarged, horizontal cross-sectional view of the hopper and associated mechanism taken on line 3—3 of Figure 2, Figure 4 is an enlarged cross-sectional view taken on line 4—4 of Figure 2, Figure 5 is an enlarged perspective view of a portion of the adjustable feed regulating member, Figure 6 is an enlarged perspective view of another portion of the adjustable feed regulating member, Figure 7 is an end view of the one portion of the agitating and feeding roller, and Figure 8 is a side view of the device shown in Figure 7.

Referring to Figure 1, the invention herein is shown as embedded in a cultivator 10 having a main frame 11 from which a plurality of adjustable ground engaging elements 12 depend. The frame 11 may desirably consist of horizontal spaced L-shaped angle irons 13 connected together by suitable cross braces to form a unitary structure.

Secured to and depending from the frame 11 at opposite ends thereof, are spaced brackets 14 provided with bearings (not shown) for journalling the stub shafts 15. Wheels 16 are keyed to the shafts 15 for rotation therewith. Adjacent their inner ends, the shafts 15 carry sprockets 17, adjustably secured thereon for rotation therewith, and drivingly connected by chains 18 with sprockets 19 mounted on shafts 20. The shafts 20 carry the material agitating and feeding rotors hereinafter described, and are driven by the wheels 16 through the chain and sprocket drives just described. Any suitable means, such as the attachments 21, 22 and 23, may be provided for attaching the cultivator 10 to a tractor or other prime mover for pulling the same, and for holding it in a desired adjusted angular position for proper engagement of the elements 12 with the ground.

Mounted on the frame 11 are identical material feeding and distributing devices 25 which are spaced apart to distribute material on opposite sides of adjacent ground rows or furrows. These devices are bolted to the upstanding flanges of angle irons 26, which latter in turn are bolted to the frame members 13. Additional openings 27 are provided in the frame members 13 for adjustably positioning the angle irons 26 to correspond to the distance between adjacent rows or furrows.

Each of the devices 25 comprises a lower cast iron base portion 27 and an upper sheet metal portion 28. The cast iron base portion 27 may desirably be formed with substantially vertical side wall portions 29, a downwardly and rearwardly inclined front wall portion 30, and a concavely curved bottom wall portion 31. Outwardly flaring flanges 32 extend upwardly from the top edges of the side and front wall portions 29 and 30 for receiving the corresponding lower edge portions of the sheet metal member 28, to which they are secured by bolts 33.

The concavely curved bottom wall portion 31 curves rearwardly and upwardly from its lowest point and terminates in a rearwardly extending, substantially horizontally disposed, lip 34. This provides a relatively shallow pocket 35 at the bottom of the device from which material may readily be thrown on to the lip, shelf or platform 34 in a manner hereinafter described. The lip 34 extends transversely of the device between the side walls 29 and forms therewith, and with the rear lower edge of the sheet metal portion 28, a rear discharge opening 36.

A discharge spout 40 is pivotally mounted on the side wall portions 29, as at 41, and extends downwardly and rearwardly from the lip 34 to receive material discharged over its rear edge 42. The spouts 40 are preferably formed with laterally spaced discharge portions 43, to which rubber hoses or the like 44 are secured, for distributing material on both sides of a row or furrow.

Material is fed from the base portion 27 of the hopper on to the lip or shelf 34 by an agitating and feeding rotor 45. In a preferred construction, the rotor 45 consists of two complemental half sections made up of the split sleeve portions 46 and 47 and the blades 48. The sections 46 and 47 are shaped to snugly engage and encircle the shaft 20 and are secured in assembled relation therewith by a single bolt 50. For this purpose the shaft 20 and sections 46 and 47 are provided with aligned openings 51 and 52 for receiving the bolt 50, the openings 52 preferably being tapered as shown and somewhat larger at their smaller ends than the diameter of the bolt.

To facilitate proper alignment and assembly of the complemental half sections of the rotor, and further to provide for proper spacing of the blades 48, the sleeve section 46 is provided, adjacent one end thereof, with a projection 53. This projection fits into a correspondingly shaped recess 54 in the sleeve section 47 thereby serving to axially align and properly position the two sections with respect to each other. It will be noted, in this connection, that one of the blades 48 is mounted in part on the projection 53.

As shown in Figure 3, the blades 48 are preferably arranged in two series, spaced apart axially of the rotor, the four blades of each series, as illustrated, being arranged at right angles to each other, and the blades of one series being circumferentially offset approximately 45° with respect to the blades of the other series. The blades 48 are desirably flat in shape and extend radially outward from their respective sleeve sections.

To increase the effectiveness of the blades 48 for moving material from the base portion of the hopper to the lip or shelf 34, the same are arranged so that the flat faces thereof are inclined at an angle of approximately 45°, more or less, to their direction of rotation, the blades of the two series being oppositely inclined in a manner such as to throw material inwardly toward the space between the two series of blades. As a result of this construction, the two series of blades throw the material in converging substantially spiral paths causing it to have greater force than it would otherwise have if the blades were disposed substantially at right angles to their direction of movement.

The shaft 20 and the rotor 45, which is secured thereto, are rotated by the wheels 16 through the chain and sprocket connections 17, 18 and 19. The shaft 20 is rotatably supported in bearings 55 secured to the side wall portions 29 of the base portion 27, by bolts 56.

Movement of material from the hopper through the discharge opening 36 is controlled by an adjustable feed regulating gate or member 60. The member 60 may desirably comprise a portion 61, formed of wood or similar material, and a portion 62, formed of sheet metal or the like, and secured in a groove 63 of the portion 61 by bolts 64. The member 60 is secured to the rear wall 65 of the sheet metal hopper portion 28 and is adjustable thereon to project the portion 62 across varying portions of the discharge opening 36. The portion 62, of course, is of sufficient width to substantially completely close the opening 36 between the side wall portions 29.

The gate member 60 is held in adjusted position on the wall 65 by a locking device 66 received in a slot 67 which extends downwardly from the top edge of the gate member, as shown in Figure 1. The locking device 66 comprises a locking plate 68 and a clamping block 69 which are secured to the wall 65 by a bolt 70 and a wing nut 71. A square hole 65a is provided in the wall 65 for receiving the squared shank portion 72 of the bolt 70 to prevent rotation thereof when the wing nut 71 is turned.

As shown more clearly in Figure 5, the locking plate 68 comprises an elongated bar or strip having one face 73 thereof substantially flat for engagement with the outer surface of the wall 65. On its opposite face, the locking plate 68 is provided with a plurality of transversely extending teeth 74 and intervening grooves 75 for a purpose hereinafter described. An opening 76 is provided in one end of the member 68 and is preferably square in cross-sectional shape to receive the squared shank portion 72 of the bolt 70.

The clamping block 69 is formed with side wall portions 77 which abut the lateral edges of the slot 67. Flanges 78 extend laterally outward from the walls 77 for engagement with the outer surface portions of the gate member 60 adjacent the edges of the slot 67.

On the face thereof opposite the flanges 78 the clamping block 69 is provided with a groove 79 for receiving the locking plate 68. The groove 79 may be formed by extending the side wall portions 77 beyond the surface portions 80 of the block as shown at 81. Adjacent one end of the groove 79, the block 69 is provided with a transverse tooth 82 which is designed to fit in the grooves 75 of the locking plate 68 to lock the clamping block in a desired position.

The clamping block 69 is further provided with an opening or slot 83 to receive the bolt 70. The slot 83 is preferably elongated as shown to permit limited longitudinal adjustment of the block 69 with respect to the locking plate 68. It will be apparent from the above description that when the wing nut 71 it tightened on the bolt 70, the gate member 60 will be securely clamped between the flanges 78 of the clamping block 69 and the wall 65 of the hopper. It will also be apparent that the tooth 82 of the clamping block will be securely held in one of the grooves 75 of the locking plate 68 between adjacent teeth 74.

To assist in guiding and maintaining the gate member 60 in adjusted position, a guide bolt 85 is mounted in an opening 86 adjacent the lower portion of the wall 65 and extends through an elongated slot 87 of the gate member. A wing nut 88 and interposed spring 89 resiliently urge the gate member into engagement with the wall 65. Washers 90 and 91 may desirably be positioned between the outer end of the spring 89 and the wing nut 88 and between the inner end of the spring 89 and the gate member 60.

Operation

In the use of the invention the cultivator 10 is hitched to a tractor or other prime mover by means of the attachments 21, 22 and 23, and suitable adjustments are made to insure that the ground engaging elements 12 are properly positioned to carry out their intended functions. The material distributing devices 25 are then adjusted on the frame 11 to correspond to the distance between adjacent rows or furrows which it is desired to fertilize. This is very simply accomplished by removing the bolts which secure the angle irons 26 to the frame members 13, moving the angle irons to the desired positions, and reinserting the bolts. At the same time it will, of course, be necessary to realign the sprocket 17 with the sprocket 19 by moving it to a new adjusted position on the shaft or axle 15. Following this the gate members 60 are adjusted to the desired positions to control the movement of material from the hoppers to the discharge openings 36.

Each of the gate members 60 is rather simply adjusted by loosening the wing nut 71 to release the clamping block 69 and sliding the gate member upwardly or downwardly, as required, to secure the desired rate of discharge of material. Movement of the gate member may be facilitated by the provision of a U-shaped handle 93 secured to the top thereof by screws 94, as clearly shown in Figure 1. When the desired adjustment is obtained the wing nut 71 is again tightened to securely clamp the gate member against the wall 65 of the hopper. Further adjustment of the gate member may be secured by loosening the wing nuts 81 sufficiently to permit the block 69 to be moved relative to the locking plate 68. This adjustment is, of course, limited by the length of the slot 83.

When the indicated adjustments have been completed the hoppers of the distributing devices 25 are filled with fertilizer or the like and pulled over the ground, to be fertilized, by a tractor. During such movement the agitating and feeding rotors 45 are rotated by the wheels 16 through the sprocket and chain drives 17, 18 and 19. As the rotors 45 rotate in a clockwise direction, as viewed in Figure 2, the blades 48 thereof throw the material upwardly and rearwardly in converging spiral paths onto the lip or apron 34. As the rotors 45 continue to throw material on the shelf 34 sufficient pressure quickly develops to cause a continuous discharge of same over the rear edge 42 thereof into and through the sprout 40 and rubber hoses 44 onto the ground on either side of a row or furrow. When the rotors 45 cease to rotate, as for example when the machine is stopped, the pressure on the material piled on the shelf 34 likewise ceases, with the result that no material is discharged from the shelf into the sprout 40.

It should be noted that the shelf 34 is of substantial width from front to rear thereof, and that it extends entirely across the base of the hopper between the side wall portions 29. This provides a substantial area on which material can be retained until sufficient pressure is developed by rotation of the rotors 45 to effect discharge thereof over the rear edge 42. It should further be noted that the shelf 34 is positioned substantially below the axis of rotation of the rotors 45 and rather close to the extreme lower portion of the curved bottom wall portion 31. This facilitates feeding of the material from the hopper on to the shelf 34 by the rotors 45 and greatly increases the effectiveness and uniformity of material distribution.

It should also be noted that the opening 36 is relatively large and in fact, in actual practice, would usually be approximately four inches across. By virtue of this and the arrangement of the shelf 34 it is possible to open the adjusting gate 60 to a point where lint, trash and the like may pass through without clogging the opening.

The distributing devices 25 may be used in pairs, as shown, or as individual units. In the latter case, of course, the device 25 could be incorporated in a horse-drawn or other suitable type of distributing vehicle. It will also be appreciated that the principles of the invention are applicable to spreaders such as those used for fertilizing lawns and the like. For this use, a single elongated trough may be mounted on wheels, divided into a plurality of individual hoppers by suitable partitions, and an agitating and feeding rotor, similar to the rotor 45, mounted in each hopper on a single shaft. Individual shelves, similar to the shelf 34, and individual gate members, similar to the gate member 60, could be provided for each hopper.

It will thus be seen that the present invention provides improved apparatus for distributing fertilizer and like materials uniformly on the ground. While a preferred embodiment of the invention has been illustrated and described it is not intended that the invention be limited to the specific details thereof except as covered in the following claim.

We claim:

Apparatus for feeding materials comprising a receptacle having a discharge opening therein, means for feeding material from said receptacle through said discharge opening, a feed regulating member disposable across said opening for varying the discharge of material therethrough, said member having an elongated slot therein, and a locking device slidably positioned in said slot for clamping said member to the receptacle, said locking device comprising a clamping block engageable with said member adjacent the edges of the slot therein, a toothed projection on said clamping block, a locking plate positioned between said clamping block and the receptacle and having a plurality of grooves therein for engagement with said projection, and means for securing said member, clamping block, and locking plate in assembled relation with said receptacle.

References Cited in the file of this patent

UNITED STATES PATENTS

| | | |
|---|---|---|
| 54,126 | De Camp | Apr. 24, 1866 |
| 208,599 | Hildrup et al. | Oct. 1, 1878 |
| 215,387 | Nauman et al. | May 13, 1879 |
| 247,330 | Franklin | Sept. 20, 1881 |
| 1,033,907 | Kinney | July 30, 1912 |
| 1,573,493 | Heyd | Feb. 16, 1926 |
| 2,546,702 | Ready | Mar. 27, 1951 |